United States Patent
Rixon et al.

[11] Patent Number: 5,722,302
[45] Date of Patent: *Mar. 3, 1998

[54] ADJUSTABLE PEDAL ASSEMBLY

[75] Inventors: Christopher J. Rixon, Tecumseh, Canada; Christopher Bortolon, Clawson, Mich.

[73] Assignee: Teleflex, Inc., Plymouth Meeting, Pa.

[*] Notice: The term of this patent shall not extend beyond the expiration date of Pat. No. 5,632,183.

[21] Appl. No.: 720,682

[22] Filed: Oct. 2, 1996

Related U.S. Application Data

[63] Continuation-in-part of Ser. No. 513,017, Aug. 9, 1995, Pat. No. 5,632,183.
[51] Int. Cl.⁶ ........................................... G05G 1/14
[52] U.S. Cl. ............................................. 74/512; 74/514
[58] Field of Search .............................. 74/512, 513, 514, 74/560; 403/109, 377

[56] References Cited

U.S. PATENT DOCUMENTS

| | | | |
|---|---|---|---|
| 3,151,499 | 10/1964 | Roe | 74/560 |
| 3,319,487 | 5/1967 | Lystad et al. | 74/560 |
| 3,359,821 | 12/1967 | Beardsley et al. | 74/478 |
| 3,643,525 | 2/1972 | Gibas | 74/512 |
| 3,958,677 | 5/1976 | Spanelis | 74/513 |
| 4,582,653 | 4/1986 | Blanchard et al. | 261/65 |
| 4,640,248 | 2/1987 | Stoltman | 423/399 |
| 4,869,220 | 9/1989 | Imoehl | 123/399 |
| 4,870,871 | 10/1989 | Ivan | 74/513 |
| 4,875,385 | 10/1989 | Sitrin | 74/512 |
| 4,905,544 | 3/1990 | Ganoung | 74/858 |
| 4,912,997 | 4/1990 | Malcolm et al. | 74/335 |
| 4,915,075 | 4/1990 | Brown | 123/399 |
| 4,944,269 | 7/1990 | Imoehl | 123/399 |
| 4,958,607 | 9/1990 | Lundberg | 123/399 |
| 4,989,474 | 2/1991 | Cicotte et al. | 74/512 |
| 5,010,782 | 4/1991 | Asano et al. | 74/512 |
| 5,045,035 | 9/1991 | Ganoung | 475/42 |
| 5,078,024 | 1/1992 | Cicotte et al. | 74/512 |
| 5,233,882 | 8/1993 | Byram et al. | 74/514 |
| 5,335,563 | 8/1994 | Yamamoto et al. | 74/512 |
| 5,408,899 | 4/1995 | Stewart | 74/513 |
| 5,460,061 | 10/1995 | Reading et al. | 74/512 |

FOREIGN PATENT DOCUMENTS 4128519  4/1992  Japan.

*Primary Examiner*—Charles A. Marmor
*Assistant Examiner*—Mary Ann Battista
*Attorney, Agent, or Firm*—Howard & Howard

[57] ABSTRACT

The pedal assembly includes an upper hub structure and a pedal arm extending downwardly from the hub structure and mounting the pedal pad. The hub structure is slidably mounted on a single hollow guide rod extending rearwardly from a transmission housing which in turn is rigidly secured to a pivot arm. The pivot arm is pivotally mounted to a bracket secured to the firewall of the vehicle. A nut is positioned slidably within the hollow guide rod and a screw shaft extends rearwardly from the transmission housing for threaded engagement with the nut. The upper end of the pedal arm extends upwardly through a slot in the bottom of the hub structure and through a slot in the bottom of the guide rod and the nut is positioned on the upper end of the pedal arm within the hub so that linear movement of the nut within the hollow rod as generated by rotation of the screw shaft results in forward and rearward movement of the pedal assembly along the guide rod. The screw shaft is driven by a transmission positioned in the transmission housing and the transmission is in turn driven by a cable driven by an electric motor mounted on the lower end of the pivot arm proximate the mounting location of the guide rod on the pivot arm.

8 Claims, 5 Drawing Sheets

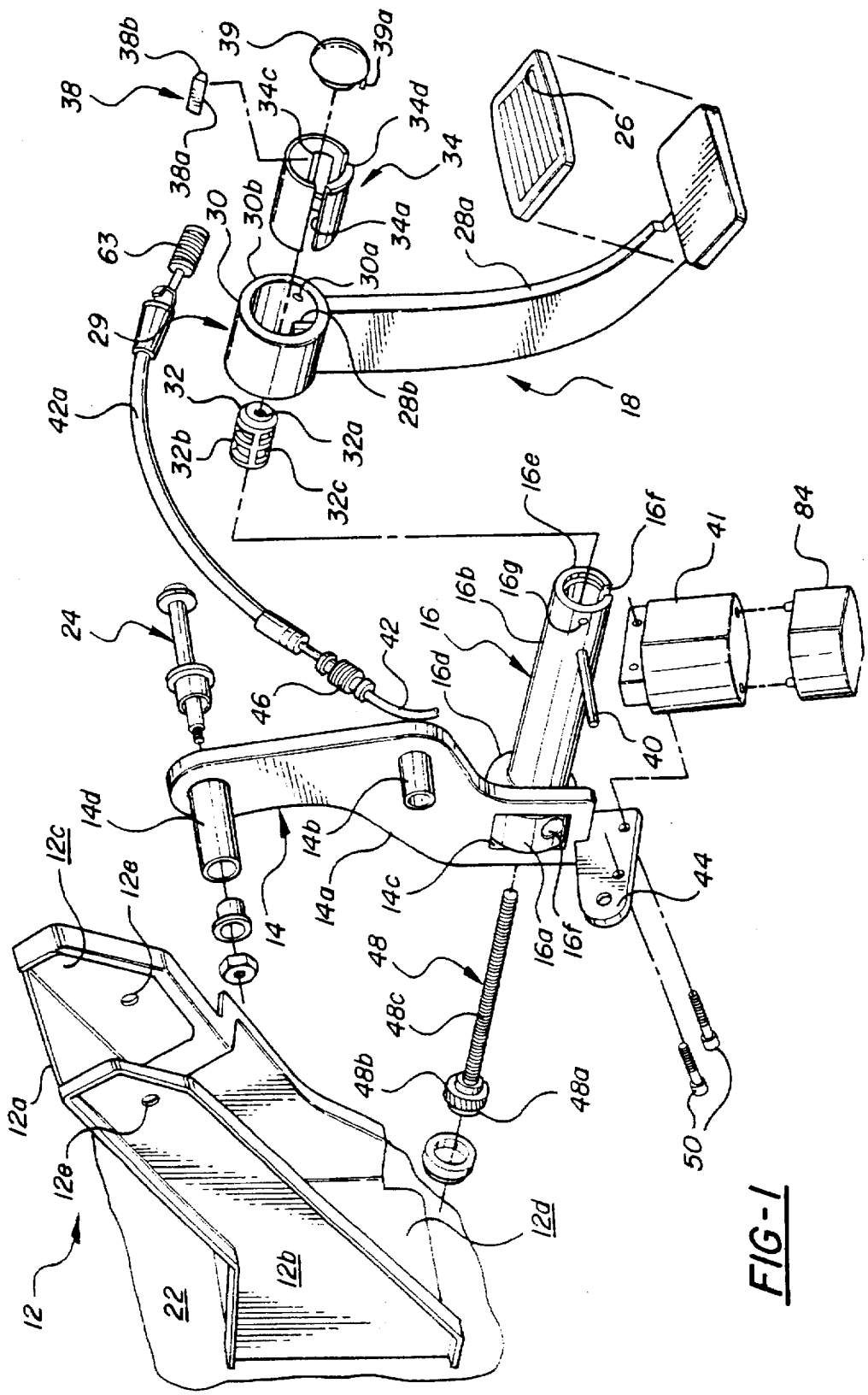

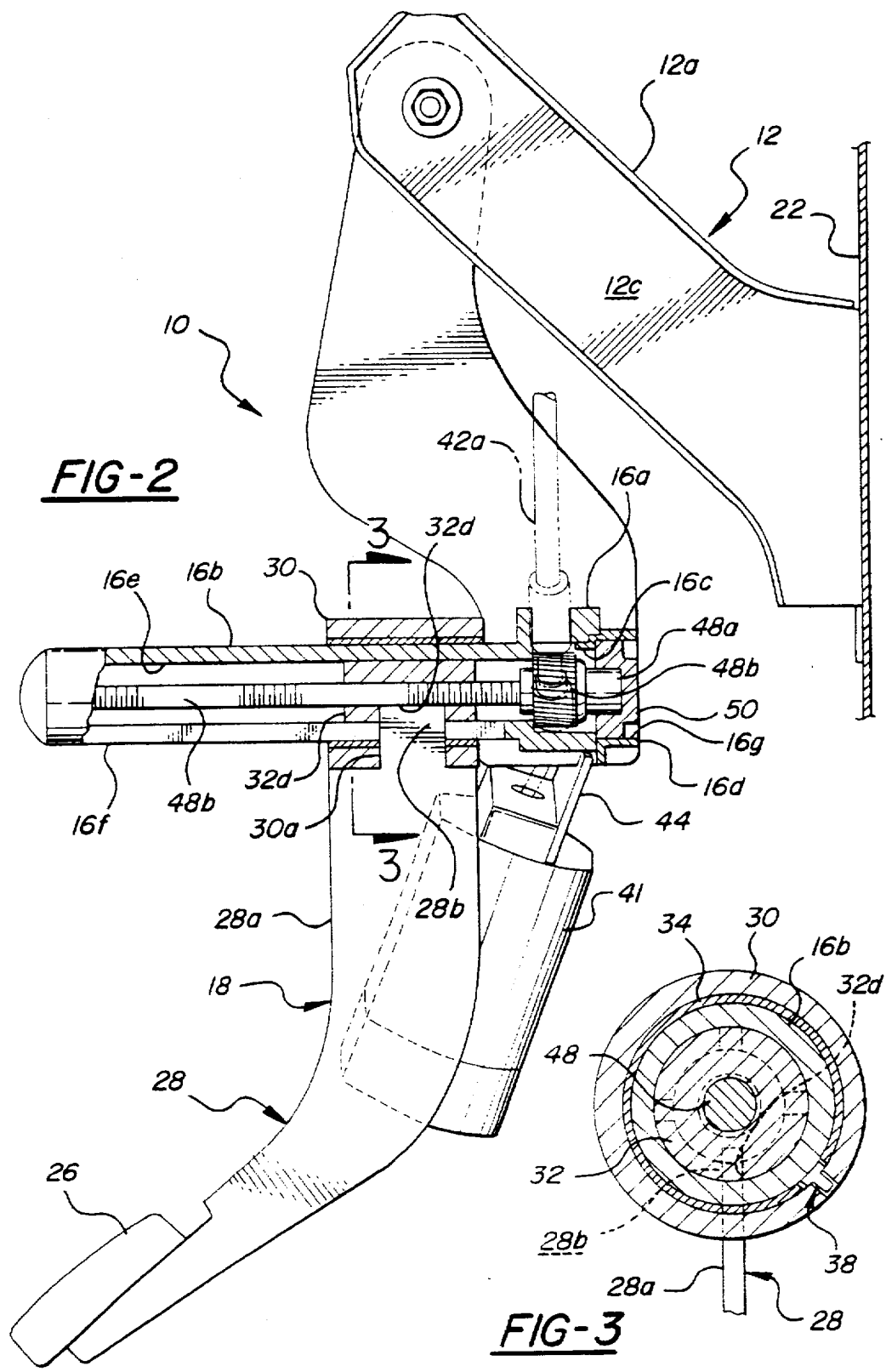

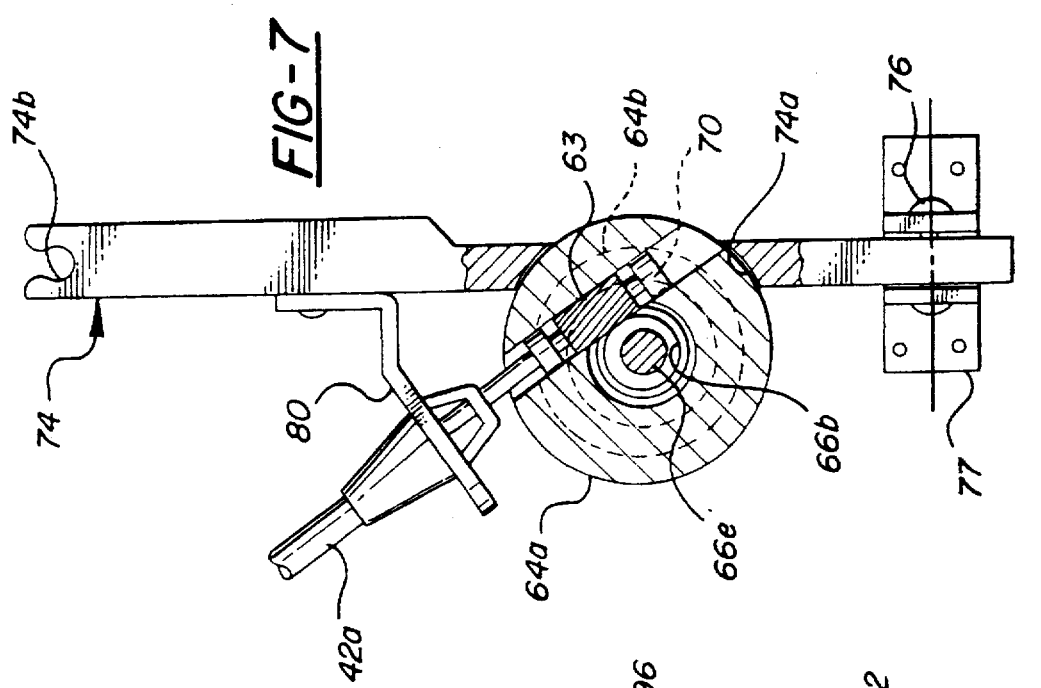
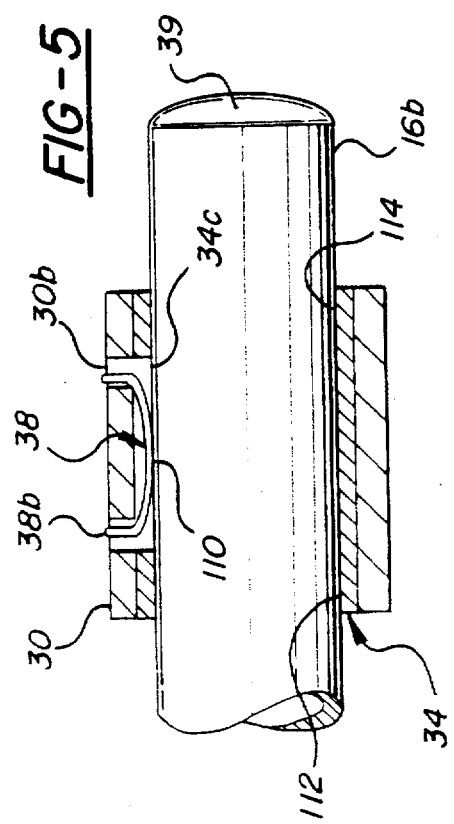
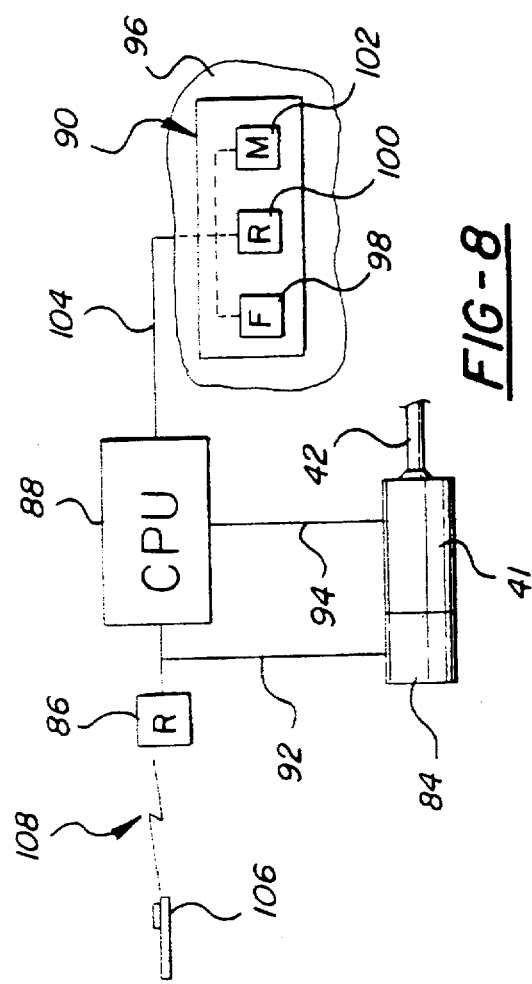

ADJUSTABLE PEDAL ASSEMBLY

RELATED APPLICATION

This application is a Continuation-In-Part of U.S. patent application Ser. No. 08/513,017, filed on Aug. 9, 1995, now U.S. Pat. No. 5,632,183.

BACKGROUND OF THE INVENTION

This invention relates to control pedal apparatuses and more particularly to adjustment means for selectively adjusting the position of one or more of the control pedals of a motor vehicle.

In a conventional automotive vehicle pedals are provided for controlling brakes and engine throttle. If the vehicle has a manual transmission a clutch pedal is also provided. These pedals are foot operated by the driver. In order for the driver to maintain the most advantageous position for working these control pedals the vehicle front seat is usually slidably mounted on a seat track with means for securing the seat along the track in a plurality of adjustment positions.

The adjustment provided by moving the seat along the seat track does not accommodate all vehicle operators due to differences in anatomical dimensions. Further, there is growing concern that the use of seat tracks, and especially long seat tracks, constitutes a safety hazard in that the seat may pull loose from the track during an accident with resultant injuries to the driver and/or passengers. Further, the use of seat tracks to adjust the seat position has the effect of positioning shorter operators extremely close to the steering wheel where they are susceptible in an accident to injury from the steering wheel or from an exploding air bag. It is therefore desirable to either eliminate the seat track entirely or shorten the seat track to an extent that it will be strong enough to retain the seat during an impact. Shortening or eliminating the seat track requires that means be provided to selectively move the various control pedals to accommodate various size drivers.

Various proposals were made over a period of many years to provide selective adjustment of the pedal positions to accommodate various size drivers but none of these proposals met with any significant commercial acceptance since the proposed mechanisms were unduly complex and expensive and/or were extremely difficult to operate and/or accomplished the required pedal adjustment only at the expense of altering other critical dimensional relationship as between the driver and the various pedals. Recently a control pedal mechanism has been developed which is simple and inexpensive and easy to operate and that accomplishes the required pedal adjustment without altering further critical dimensional relationships as between the driver and the various pedals. This control pedal mechanism is disclosed in U.S. Pat. Nos. 4,875,385; 4,989,474 and 5,078,024 all assigned to the assignee of the present application. The present invention represents improvements to the basic adjustable control pedal design disclosed in these patents.

SUMMARY OF THE INVENTION

This invention is directed to the provision of a simple, inexpensive and effective apparatus for adjusting the control pedals of a motor vehicle.

This invention adjustable pedal apparatus is intended for use with any of the control pedals of a motor vehicle and provides a simple and effective means of adjusting the position of the pedal to match the particular anatomical dimension of the operator.

The invention pedal apparatus includes a pedal support structure including a pivot arm and a rod structure extending rearwardly and rigidly from the pivot arm; a screw shaft extending proximate to and parallel to the rod structure; drive means for driving the screw shaft; and a pedal structure including an upper guide structure, defining a smooth guide bore slidably receiving the guide rod and a threaded bore threadably receiving the screw shaft, and a pedal arm extending downwardly from the upper guide structure. This arrangement provides a simple and effective means for readily adjusting the position of the pedal structure.

According to a further feature of the invention, the rod structure is hollow; the screw shaft is positioned concentrically within the hollow of the rod structure; and the upper guide structure of the pedal structure includes an outer hub structure slidably mounted on the rod structure, a nut positioned slidably within the hollow of the rod structure and threadably receiving the screw shaft, and drive means drivingly interconnecting the pedal structure and the nut. This specific packaging arrangement as between the pedal structure, screw shaft and rod structure provides a compact and simple apparatus for readily adjusting the pedal position.

According to a further feature of the invention, an elongated slot is provided in the hollow rod structure opening in the rearward end of the rod structure, a slot is provided in the hub structure, the pedal arm includes an upper end portion extending upwardly through the hub structure slot and into the hollow of the hub structure, and the nut is positioned in the upper end of the pedal arm upper end portion. This specific driving arrangement as between the nut and the pedal structure provides a simple and effective drive package.

According to a further feature of the invention, the apparatus further includes an electric motor mounted on the pivot arm proximate the mounting location of the guide rod on the pivot arm; the screw shaft forms a part of an elongated drive member positioned within the guide rod and including a driven gear positioned proximate the mounting location of the guide rod on the pivot arm; a cable extends from the output of the motor to a driving gear drivingly engaging the driven gear, whereby energization of the motor moves the pedal structure axially forwardly and rearwardly along the guide rod.

According to a further feature of the invention, the apparatus further includes a further mounting bracket; a further pivot arm pivotally mounted on the further mounting bracket; a further hollow guide rod mounted on the further pivot axis at a further mounting location spaced from the pivot axis of the further pivot arm and extending rearwardly from the further pivot arm; a further pedal structure including an upper hollow hub structure slidably mounted on the further guide rod and a pedal arm extending downwardly from the hub structure; a further nut positioned in the hollow of the further guide rod; a further elongated drive member positioned within the further guide rod and including a further driven gear positioned proximate the further mounting location and a threaded shaft extending forwardly within the further guide rod and threadably engaging the further nut; further drive means interconnecting the further nut and the further pedal structure; a further driving gear drivingly engaging the further driven gear; and a further cable extending from the driving gear to the further driving gear. With this arrangement, energization of the motor moves the pedal structure axially forwardly and rearwardly along the guide rod and simultaneously moves the further pedal structure axially forwardly and rearwardly along the further guide rod.

BRIEF DESCRIPTION OF THE DRAWINGS

FIG. 1 is an exploded perspective view of an adjustable brake pedal assembly according to the invention;

FIG. 2 is a longitudinal cross-sectional view of the brake pedal assembly;

FIG. 3 is a cross-sectional view taken on lines 3—3 FIG. 2;

FIG. 5 is a fragmentary cross-sectional view of the brake pedal assembly;

FIG. 7 is a detail view of a portion of the accelerator pedal assembly; and

FIG. 8 is a circuit diagram for use with the invention adjustable pedal assemblies.

DETAILED DESCRIPTION OF THE PREFERRED EMBODIMENT

Figure 4:
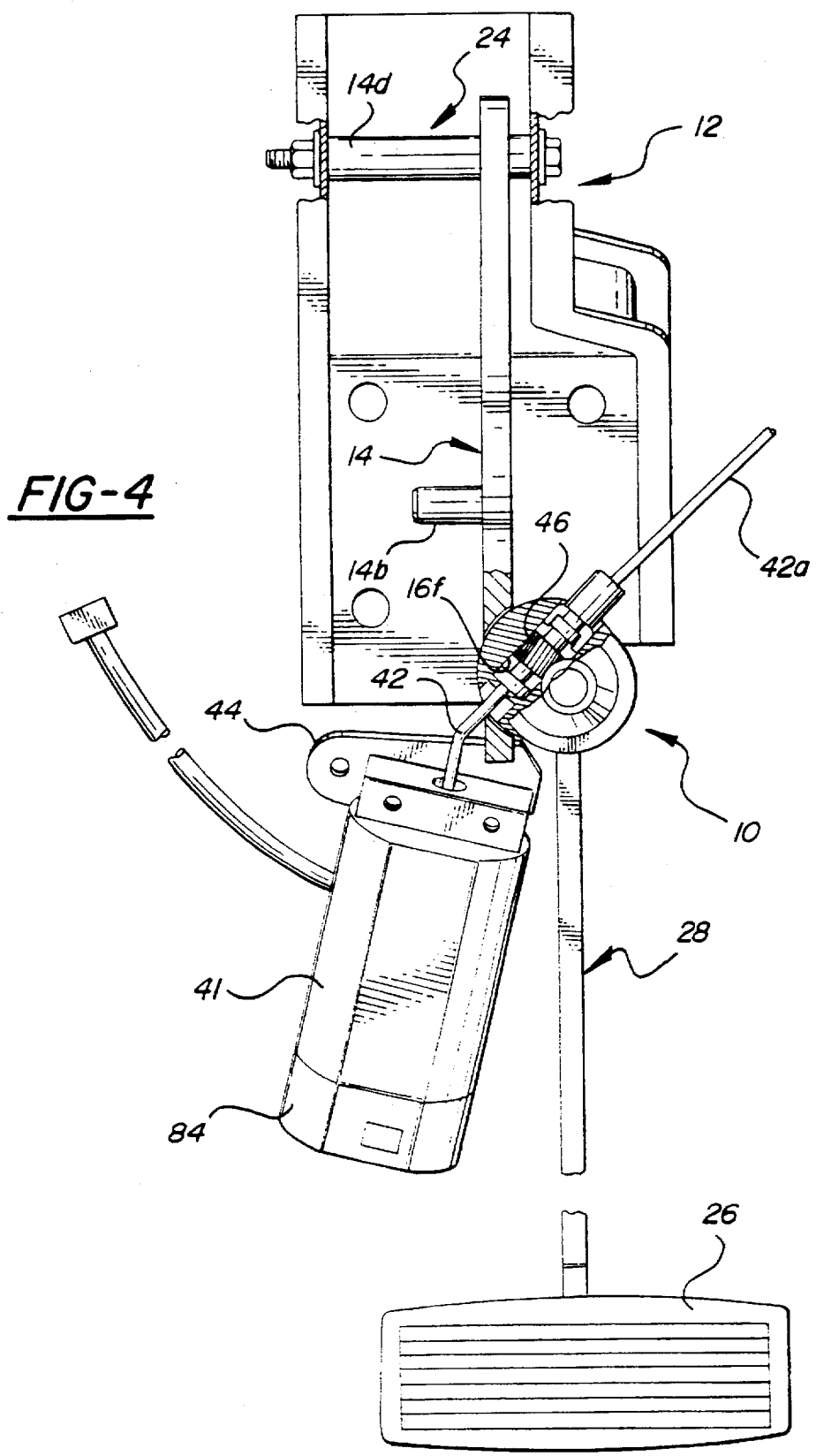
FIG. 4 is a front view of the brake pedal assembly.

The invention brake pedal assembly (FIGS. 1–5) includes a mounting bracket 12, a pivot arm 14, a guide rod structure 16, a pedal assembly 18, and a drive assembly 20.

Mounting bracket 12 may be formed of any suitable sheet metal material in a suitable stamping operation and is intended for suitable securement to the firewall 22 of the associated motor vehicle. Bracket 12 includes a top wall 12a, laterally spaced upwardly extending side walls 12b and 12c, and a front wall 12d.

Pivot arm 14 includes a main body portion 14a, a brake rod attachment pivot 14b for attachment of a brake actuator rod, a lower window 14c, and an upper spacer hub structure 14d. Pivot arm 14 is pivotally mounted at its upper end between bracket side walls 12b and 12c by a screw and bushing assembly 24 positioned in bracket apertures 12e.

Guide rod structure 16 has an elongated, circular, tubular configuration and includes a forward transmission housing portion 16a and a shaft portion 16b.

Transmission housing portion 16a is enlarged relative to shaft portion 16b and defines a central bore 16c opening at the forward end 16d of the rod structure.

Shaft portion 16b extends rigidly rearwardly from transmission housing portion 16a, defines a central bore 16e coincident with bore 16c, is open at its rear end 16f, and includes a bottom axial slot 16g. Slot 16g extends forwardly from a location proximate transmission housing portion 16a and opens at the rear end 16f of the shaft portion.

Pedal assembly 18 includes a pedal pad 26, a pedal arm 28 carrying the pedal pad 26 at its lower end, and an upper guide structure 29.

Pedal arm 28 includes a main body portion 28a and a reduced width upper end portion 28b.

Upper guide structure 29 includes a hub structure 30 and a nut 32. The reduced width upper end portion 28b of the pedal arm passes upwardly through a bottom slot 30a in hub structure 30 to position upper end portion 28b in the hollow of the hub structure whereafter the pedal arm and hub are welded together to form a unitary pedal arm/hub assembly.

Hub structure 30 is sized to be slidably mounted on rod structure shaft portion 16b with the aid of a split bushing 34 positioned within the hub structure. Hub structure 30 and bushing 34 will be seen to coact to define a smooth guide bore slidably receiving rod structure shaft portion 16b whereby to enable the pedal assembly to move smoothly axially forwardly and rearwardly with respect to the rod structure.

Nut 32 may be formed of plastic, has a circular cross-sectional configuration, is sized to fit slidably within the bore 16a of the rod structure shaft portion, and includes a threaded central bore 32a. Nut 32 may include axial and circumferential ribs 32b, 32c to minimize weight and minimize sliding friction between the nut and the rod shaft portion.

Nut 32 is positioned on the upper end of pedal arm 28 with the reduced width upper end portion 28b nested in a downwardly opening slot or pocket 32d in the bottom of the nut.

Bushing 34, in addition to split 34a, includes an axially extending slot 34b and a window 34c. Slot 34b accommodates the pedal arm upper end portion 28b and window 34c accommodates a leaf spring 38 (FIGS. 1, 3 and 5).

Leaf spring 38 includes a main body portion 38a positioned in window 34c and end tab portions 38b positioned in axially spaced apertures 30b in hub structure 30. With tabs 38b positioned in apertures 30b, main body portion 38a of the spring is positioned within and passes through window 34c to act against rod shaft portion 16b at the interface between the rod shaft portion and bushing 34.

The open rear end 16f of the rod structure is closed by a disc-shaped nose piece 39 which fits over the open rear end of the rod structure and is held in place by a rolled pin 40 passing through diametrically opposed apertures 16h in the rear end of the rod structure and through apertures in diametrically opposed lugs 39a on nose piece 39.

Drive assembly 20 includes a motor 41, a Bowden cable 42, a bracket 44, a worm gear 46, and an elongated drive member 48.

Motor 41 comprises a small electric DC motor of known form.

Bracket 44 is fixedly secured to the lower end of pivot arm 14 and mounts motor 41 utilizing suitable thread cutting screws 50.

Worm gear 46 is journaled in a chordal bore 16i in transmission housing 16a.

Cable 42 is driven by the output shaft of motor 41 and drivingly engages worm gear 46 whereby energization of the motor rotates worm gear 46.

Elongated drive member 48 includes a forward journal portion 48a, a worm wheel portion 48b, and a rearwardly extending screw shaft portion 48c.

Drive member 48 is positioned in the hollow of rod structure 16 with forward journal portion 48a journaled in a retainer 52 suitably positioned in a counterbore in the open front end of the rod structure, worm wheel 48b drivingly engaging worm gear 46, and screw shaft portion 48 threadably engaging nut central bore 32a so that energization of motor 41 has the effect of sliding nut 32 forwardly and rearwardly within bore 16e whereby to adjust pedal assembly 18 forwardly and rearwardly along the rod structure.

To assemble the invention brake pedal apparatus, a weldment is formed by welding the transmission portion 16a of the rod structure within the window 14c of the pivot arm 14 and welding the motor bracket 44 to the lower end of the pivot arm; the weldment is mounted on bracket 12 using bolt assembly 24; the upper end 28b of pedal arm 28 is moved upwardly through the slot 30a in the hub 30 and welded in position; nut 32 is positioned on top of pedal arm portion 28b; spring 38 is positioned on the inner periphery of the hub 30 with end tabs 38b positioned in apertures 30b; bushing 34 is installed in hub 30 by pushing the bushing rearwardly into the hub with slot 34b aligning with and moving around pedal arm upper portion 28b, window 34c moving into position over spring 38, and flange 34d on the rear end of the bushing coacting with the rear end 30c of the hub to preclude forward movement of the bushing relative to the hub and upper pedal arm portion 28b coacting with slot 34b to preclude rearward movement of the bushing relative to the hub; the pedal assembly is offered up to rod structure 16 with the hub 30 slipping over the outer periphery of shaft portion 16b of the rod structure, upper pedal arm portion 28b moving into slot 16g, and nut 32 moving to a nested position within the hollow of shaft portion 16b; drive member 48 is inserted into the forward end of the rod structure to threadably engage screw shaft portion 48c with nut 32; drive member 48 is spun manually to move nut 32 to a desired axial position within the rod structure; retainer 52 is positioned within a counterbore in the forward end of the rod structure to journal the journal portion 48a of the drive member whereafter the retainer is held in position either by a snap ring or by suitable peening; worm gear 46 is positioned in a bore 16i in guide rod transmission portion 16a in driving engagement with worm wheel portion 48b of the drive member 48; nose piece 39 is positioned on the rearward end of the rod structure utilizing roll pin 40; motor 41 is mounted on motor bracket 44 utilizing thread cutting screws 50; and cable 42 is drivingly interconnected between the output of the motor and worm gear 46.

The brake pedal assembly is now ready for delivery to a motor vehicle manufacturer whereat installation in the motor vehicle is accomplished simply by securing bracket 12 to the firewall of the vehicle and attaching the brake actuator rod 49 of the motor vehicle to pivot 14b.

In operation, the position of the brake pad 26 relative to the driver's seat 54 of the motor vehicle and relative to the operator is selectively adjusted by selectively energizing motor 41 to selectively move nut 32 forwardly and rearwardly within the bore 16e of rod structure 16 and thereby, via the driving interconnection between the nut and the pedal assembly, move the pedal assembly selectively forwardly and rearwardly along the rod structure.

Although the invention has thus far been described with respect to an adjustable brake pedal assembly 10, it will be understood that the invention would normally be applied to both the brake and accelerator pedal assemblies of a motor vehicle and the control pedals would be selectively adjusted simultaneously.

Figure 6:
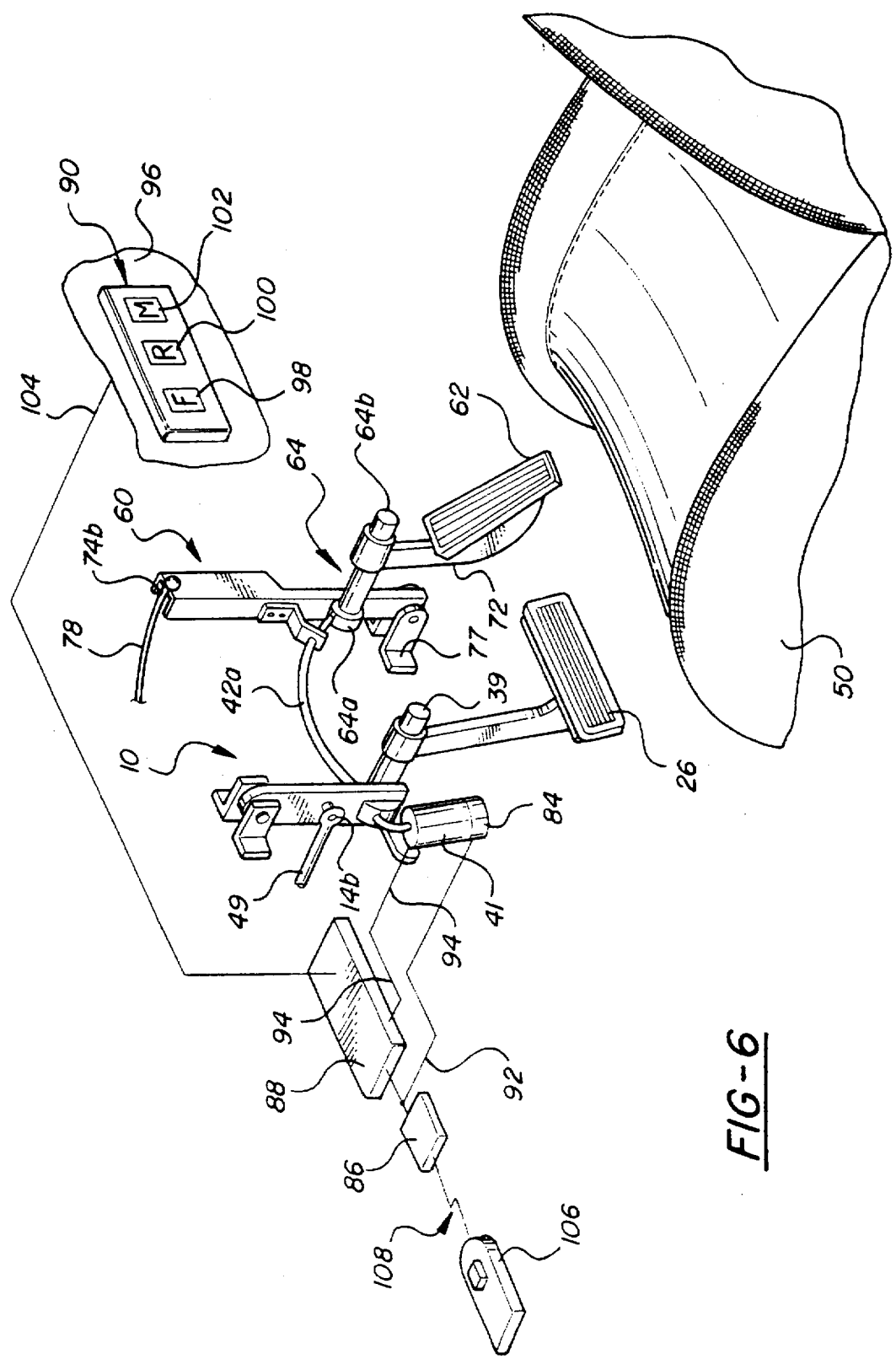
FIG. 6 is a perspective, somewhat schematic view of the brake pedal assembly shown in conjunction with an accelerator pedal assembly according to the invention.

Thus, as seen in FIG. 6, the adjustable brake pedal apparatus 10 may be adjusted according to the invention in conjunction with an adjustable accelerator pedal control apparatus 60 so that the brake pad 26 of the brake pedal apparatus and the accelerator pad 62 of the accelerator pedal apparatus are moved simultaneously. This may be accomplished as seen in FIG. 5 by extending the cable 42 from the brake pedal control apparatus 10 to the accelerator control apparatus 60 with the extended cable 42a driving a worm gear 63 journaled in the transmission housing portion 64a of the guide rod structure 64 of the accelerator pedal mechanism to drive the worm wheel portion 66b of an elongated drive member 66 positioned within the guide rod structure 64 and including a screw shaft portion 66c for engagement with the nut 70 positioned within the shaft portion 64b of rod structure 64 to move the accelerator pedal arm 72 forwardly and rearwardly along the rod structure, all in the manner previously described with respect to brake pedal assembly 10.

Transmission housing portion 64a of guide rod structure 64 is weldingly positioned in a window 74a formed in a pivot arm 74 mounted for pivotal movement at its lower end about a pivot axis 76 defined by a mounting bracket 77 secured to the vehicle firewall. Pivot arm 74 includes a cable attachment structure 74b at its upper end for attachment of an accelerator cable 78 and the apparatus further includes a cable bracket 80 secured to pivot arm 74 and operative to mount cable extension 42a in an manner to facilitate the driving connection of the cable extension to worm gear 63.

With the arrangement seen in FIG. 6, energization of the single motor 41 associated with the brake pedal assembly 10 has the effect of simultaneously adjusting both the brake pedal pad 26 and the accelerator pedal pad 62.

A control circuit for motor 41 is seen in FIGS. 6 and 8 where the control circuit, in addition to motor 41, includes a potentiometer module 84, a receiver 86, a CPU or microprocessor 88, and a control panel 90.

Potentiometer 84 attaches to the end of motor 41 remote from the motor output shaft and functions to count the revolutions of the motor and generate a signal on lead 92 indicative of the number of counted motor revolutions.

CPU 88 may comprise an existing computer already on board the vehicle. CPU 88 receives motor shaft position information from potentiometer 84 via line 92 and controls motor 41 via a lead 94.

Control panel 90 may be positioned in the instrument panel 96 of the vehicle at a location convenient to an operator positioned on seat 54 and may include a forward button 98, a rearward button 100, and a memory button 102. Control panel 90 is suitably connected to CPU 88 via a lead 104.

In the use of the invention control pedal assembly, the control pedal assemblies may be adjusted fore and aft by an operator seated on seat 54 simply by pushing forward and rearward buttons 98 and 100 selectively until the control pedal assemblies assume the desired comfortable positions for the operator or, alternatively, the control pedal assemblies may be moved automatically to preset positions utilizing a remote transmitter 106 carried on the person of the operator and operative to transmit a signal 108 to receiver 86 having a code peculiar to the operator.

In the use of the remote transmitter 106 the seated operator moves the pedal assemblies to their desired positions using forward and rearward buttons 98/100 and thereafter presses memory button 102 so as to store a setting in the memory of the computer for that particular driver corresponding to settings of the control pedal assemblies accommodating that particular driver. Thereafter, as the driver approaches the vehicle, transmitter 106 may be utilized to transmit a signal to receiver 86 coded to signal the computer to access the computer memory setting for the respective driver and actuate the motor in a sense to move the pedal assemblies to the settings accommodating the respective driver.

The invention adjustable control pedal apparatus will be seen to have many important advantages. Specifically, the design and structure of the pedal assembly facilitates the ready manufacture of each element of the pedal assembly and facilitates the ready assembly of the various elements, thereby reducing the overall cost of the total assembly. Further, the invention pedal assembly design requires fewer parts than prior art designs, provides a better running fit for the assembly, and enhances the ability to hold manufacturing and assembly tolerances. Further, the specific bushing and leaf spring assembly interposed between the hub structure of the pedal assembly and the shaft portion of the rod structure establishes a triangulated sliding interface (FIG. 5) as between the hub structure and the rod structure with one point 110 established by the interface of the spring with the rod structure along one side face of the rod structure and the other two points 112, 114 established at the respective ends of the bushing at a location diametrically opposed to the interface between the spring and the rod structure.

This triangulated interface has the effect of eliminating judder as the hub structure moves along the rod structure in response to energization of the motor to thereby provide a smooth, quiet and reliable adjusting movement of the pedal assembly along the rod structure.

Whereas a preferred embodiment of the invention has been illustrated and described in detail, it will be apparent that various changes may be made in the disclosed embodiment without departing from the scope or spirit of the invention.

We claim:

1. An adjustable pedal apparatus for a motor vehicle comprising:
   a mounting structure;
   a hollow guide rod extending rearwardly from the mounting structure and having an axially extending slot opening in a rearward end of the guide rod;
   a pedal structure including an upper guide structure slidably mounted on the guide rod and a pedal arm extending downwardly from the guide structure;
   a nut positioned slidably in the hollow of the guide rod;
   a screw positioned within the guide rod and threadably engaging the nut;
   drive means slidably positioned in the slot and interconnecting the nut and the pedal structure; and
   means for rotating the screw.

2. An adjustable pedal apparatus according to claim 1 wherein:
   the guide structure comprises a hollow hub structure including an axial slot aligned with the slot in the rod;
   the pedal arm includes an upper end portion extending upwardly through the hub structure slot, through the rod slot, and into the hollow of the hub structure; and
   the nut is positioned on an upper end of the pedal arm upper end portion.

3. An adjustable pedal apparatus according to claim 1 wherein the apparatus further includes:
   a bushing positioned between the guide structure and the rod and including an opening; and
   a spring mounted on an inner periphery of the guide structure and passing through the opening of the bushing to act against the rod at an interface between the rod and the bushing.

4. An adjustable pedal apparatus according to claim 1 wherein:
   the mounting structure includes a mounting bracket and means pivotally mounting the guide rod on the mounting bracket.

5. An adjustable pedal apparatus according to claim 4 wherein:
   the pivotally mounting means comprises a pivot arm pivotally mounted on the bracket; and
   the guide rod is rigidly secured to the pivot arm and extends rearwardly from the pivot arm.

6. An adjustable pedal apparatus for a motor vehicle comprising:
   a mounting structure;
   a hollow guide rod extending rearwardly from the mounting structure;
   a pedal structure including an upper hollow hub structure slidably mounted on the guide rod and a pedal arm extending downwardly from the hub structure;
   a nut positioned slidably in the hollow of the guide rod;
   a screw positioned within the guide rod and threadably engaging the nut;
   drive means interconnecting the nut and the pedal structure;
   means for rotating the screw;
   a bushing positioned between the hub structure and the rod and including an opening; and
   a spring mounted on an inner periphery of the hub structure and passing through the opening of the bushing to act against the rod at an interface between the rod and the bushing.

7. An adjustable pedal apparatus for a motor vehicle comprising:
   a mounting bracket;
   a pivot arm pivotally mounted on the mounting bracket;
   a hollow guide rod mounted on the pivot arm at a mounting location spaced from a pivot axis of the pivot arm and extending rearwardly from the pivot arm;
   a pedal structure including an upper hollow hub structure slidably mounted on the guide rod and a pedal arm extending downwardly from the hub structure;
   a nut positioned slidably in the hollow of the guide rod;
   an elongated drive member positioned within the guide rod and including a driven gear positioned proximate the mounting location and a threaded shaft extending forwardly within the guide rod and threadably engaging the nut whereby rotation of the drive member moves the nut axially forwardly and rearwardly within the guide rod;
   drive means interconnecting the nut and the pedal structure whereby axial forward and rearward movement of the nut within the guide rod produces axial forward and rearward movement of the pedal structure along the guide rod;
   an electric motor mounted on the pivot arm proximate the mounting location;
   a cable extending from an output of the motor; and
   a driving gear driven by the cable and drivingly engaging the driven gear whereby energization of the motor moves the pedal structure axially forwardly and rearwardly along the guide rod.

8. An adjustable pedal apparatus according to claim 7 wherein the apparatus further includes:
   a further mounting bracket;
   a further pivot arm pivotally mounted on the further mounting bracket;
   a further hollow guide rod mounted on the further pivot arm at a further mounting location spaced from a pivot axis of the further pivot arm and extending rearwardly from the further pivot arm;
   a further pedal structure including an upper guide structure slidably mounted on the further guide rod and a pedal arm extending downwardly from the guide structure;
   a further nut positioned in the hollow of the further guide rod;
   a further elongated drive member positioned within the further guide rod and including a further driven gear positioned proximate the further mounting location and a threaded shaft extending forwardly within the further guide rod and threadably engaging the further nut whereby rotation of the further drive member moves the further nut axially forwardly and rearwardly within the further guide rod;

further drive means interconnecting the further nut and the further pedal structure whereby axial forward and rearward movement of the further nut within the further guide rod produces axial forward and rearward movement of the further pedal structure along the further guide rod;

a further driving gear drivingly engaging the further driven gear; and a further cable extending from the driving gear to the further driving gear whereby energization of the motor moves the pedal structure axially forwardly and rearwardly along the guide rod and simultaneously moves the further pedal structure axially forwardly and rearwardly along the further guide rod.

* * * * *